United States Patent [19]

Shaw et al.

[11] Patent Number: 4,824,027
[45] Date of Patent: Apr. 25, 1989

[54] MEAT SEPARATING MEANS AND METHOD

[75] Inventors: Jimmie Shaw; Charles R. Brooker, both of Davenport, Iowa

[73] Assignee: The Kartridg Pak Co., Davenport, Iowa

[21] Appl. No.: 108,093

[22] Filed: Oct. 13, 1987

[51] Int. Cl.⁴ .............................................. B02C 23/16
[52] U.S. Cl. ....................................... 241/24; 241/74; 241/89.2; 241/89.3
[58] Field of Search ................ 241/74, 260.1, 24, 89.2, 241/89.3

[56] References Cited

U.S. PATENT DOCUMENTS 4,042,176  8/1977  Beck et al. ..................... 241/74 X Primary Examiner—Mark Rosenbaum
Attorney, Agent, or Firm—Lockwood, Alex, FitzGibbon & Cummings

[57] ABSTRACT

A meat separating machine for separating meat from a feed material which has an appreciable bone content. The machine includes a foraminous cylinder or screen in which a conveying auger rotates. Feed material is introduced under compression into the infeed end of the cylinder/auger combination. The auger conveys the meat material to the discharge end of the combination. During such conveyance, meat is separated from the bone and exudes through the foramina as de-boned meat. Compacted residue high in bone content discharges through a restricted discharge orifice at the discharge end of the cylinder/auger combination. The flights on the auger have an outer diameter on the infeed end which has substantial radial clearance in the neighborhood of 0.25 inch with respect to the inner diameter of the cylinder. The auger flights taper outwardly toward the discharge end where the radial clearance is from about 0.010 and 0.025. The foramina or holes in the cylinder are much larger at the infeed end than at the discharge end where they may even be eliminated. Good separation efficiencies are achieved and an improved meat product obtained with auger rotation speeds of between 100 to 500 RPM whereas in prior machines of the same general type auger speeds of 500 to 1800 RPM were utilized.

9 Claims, 2 Drawing Sheets

MEAT SEPARATING MEANS AND METHOD

This invention relates generally to new and useful improvements in meat separating machines of the type wherein a conveying screw rotates within a cylindrical foraminous housing or screen so as to separate meat from a feed material which has a appreciable bone content. Typical feed materials include the following: chicken, turkey, beef, pork, mutton and fish bones with attached meat.

The present invention may be regarded as an improvement on meat separating machines of this general type shown and described in U.S. Pat. No. 4,042,176 granted Aug. 16, 1977 to Nicholas Robert Beck et al. and available commercially from The Kartridg Pak Co., Davenport, Iowa under the trademark "YIELDMASTER".

The meat de-boning machine of U.S. Pat. No. 4,02,176 is characterized, in part, by having a perforated housing section comprising a rigid foraminous or perforated cylinder in which a conveying auger rotates at relatively high rotational speeds in the order of 500 to 1800 RPM. According to the disclosure of U.S. Pat. No. 4,042,176, in normal operation a meat-bone mixture is fed into the infeed end of the foraminous cylinder from an adjoining pressurizing auger section of the machine. Separation of meat from bone solids is effected within the perforated housing section with the meat in liquid or fluidized condition extruding or exuding through the radial foramina or small orifices in the perforated cylinder while bone solids and sinews leave the discharge end of the perforated cylinder in compacted condition through a generally frusto-conical orifice. The size of the frusto-conical orifice is set or adjusted so that it is restricted and back pressure is created on the meat-bone mixture within the perforated housing.

Since the auger rotates at a relatively high speed within the perforated cylinder of a deboning machine as disclosed in U.S. Pat. No. 4,042,176, and as embodied in the commercially available deboning machines under the trademark "YIELDMASTER", it has been found that there should be an appreciable clearance between the outer diameter (OD) of the flight on the auger and the interior diameter (ID) of the perforated housing or cylinder so that metal-to-metal contact with resulting damage is avoided. In U.S. Pat. No. 4,042,176 it is stated that the radial clearance between the conveying auger flight and interior of the perforated housing can usefully be within the range of from 5 to 15 thousandths of an inch. In commercial versions of the meat separating machine of this patent, such as the YIELDMASTER machine, a radial of clearance in the range of 10 to 25 thousandths of an inch has been found to be a practical and satisfactory range. In order for a meat separating machine of the type disclosed in U.S. Pat. No. 4,042,176 and embodied commercially in the YIELDMASTER machines to operate satisfactorily with such low radial clearances between the flights on the conveying auger and the interiors of the perforated or foraminous cylindrical housings while the conveying augers rotate at speeds in excess of 500 RPM, and still avoid metal-to-metal contact, it has been found necessary to provide very rigid supports for the augers and such rigid support has been built into the commercial deboning machines made under the YIELDMASTER trademark.

In these prior machines, the clearance between the outer diameter of the flights on the conveying augers and the interior diameter of the foraminous cylinders has been substantially uniform from the infeed end of the combination to the discharge ends. The root diameter of the conveying augers has either been uniform from the infeed end to the discharge end or a slight increase in the root diameter of a fraction of a degree toward discharge end has been incorporated with a view of decreasing the available space for the bone laden material being conveyed as it approaches the discharge end thereby forcing the meat material through the perforations or apertures while continuing to agitate and convey the boning components along the helical path. An increase in root diameter of $\frac{1}{8}$ of an inch from the infeed end to the discharge end is stated to have been found satisfactory in U.S. Pat. No. 4,042,176.

It has been found in accordance with the present invention that substantial and important improvements can be made in the structural design, manner of operation and quality of meat product obtained by providing a substantial radial clearance between the outer diameter of the flight on the conveying auger and the interior of the perforated cylinder or screen at the infeed end and then progressively decrease the radial clearance of the auger flight toward the discharge end until a desired normal radial clearance is achieved. More specifically, it has been found that the radial clearance at the infeed of the conveying auger should be in the neighborhood of about $\frac{1}{4}$ an inch and then the outer diameter of the auger flight should increase or taper outwardly moving toward the discharge end of the auger until the radial clearance is in the range of from 0.010 to 0.025 inch.

In addition to imparting this substantial infeed radial clearance and taper on the auger flight of the conveying auger, it has been found that the area of the foramina or openings in the surrounding cylindrical screen or housing adjacent its inlet end can be substantially larger (e.g. up to 0.25 inch diameter) than previously found useful (e.g. up to 0.1 inch diameter). The size of the openings should become smaller in area a they approach the discharge end of the cylindrical screen or foraminous housing. When these two changes in design are made it is has been found that there is a significant reduction in the required extrusion pressure on the meat particles with an attendant decrease in product temperature rise and an improved particle definition of the separated meat enhancing its value in processing through better binding properties and less denaturing. Further, a significant reduction in precompression on the meat material feed is permitted and the rotational speed of the auger can be reduced to the range of about 100 to 500 RPM. This reduction in auger speed further reduces product denaturing, bone shearing and product temperature rise.

Accordingly, the object of the present invention, generally stated, is a provision of improvements in machines for separating meat from a feed material which has an appreciable bone content and wherein the separation takes place within a section of the machine having a foraminous cylinder or screen in which a conveying auger rotates and causes meat to separate from the bone particles and fragments and extrude through the foramina or openings in the screen while the de-meated bone particles and fragments are transported to a discharge orifice. More specifically, the object of the invention is to provide structural and operational improvements in such machines which enhance the efficiency of the de-meating operation, improve the character of the meat which is separated, and permit the conveying auger to rotate at substantially lower speeds than previously.

The foregoing objects of the invention are obtained by modifying both the conveying auger and the foraminous cylinder or screen housing. The conveying auger is modified by constructing it with a substantial outward taper proceeding from the infeed end of the auger towards its discharge end. Thus, the taper is such as to provide a radial clearance in the neighborhood of ¼ inch at the infeed end between the outer diameter of the auger flight and the inner diameter of the housing or cylinder. The clearance decreases either uniformly or in steps until it reaches a final minimum clearance at the discharge end of the auger which is within the range previously provided for the entire length of the conveying augers in prior machines. The foraminous cylinder or screen housing is also modified by providing it with meat outlet openings adjacent the infeed end which are substantially larger than normal (i.e. which were previously utilized) and then have these openings decrease in area or size as they approach the discharge end of the cylinder housing to the point where they have the conventional or normal sizes. In fact, the openings may be entirely eliminated in the portion of the cylinder or housing which surrounds the last flight at the discharge end of the conveying auger.

The foregoing and other objects of the invention will be apparent to those skilled in the art from the following detailed description of a specific embodiment of the invention.

For a more complete understanding of the nature and scope of the invention, reference may now be had to the following detailed description thereof taken in connection with the accompanying drawings, wherein:

FIG. 3 is a fragmentary, longitudinal sectional view, partly in elevation and on enlarged scale, taken through the foraminous or perforated housing or cylinder portions of the machine shown in FIGS. 1 and 2; and FIG. 4 is a view corresponding to FIG. 3 but representing the prior art.

Figure 1:
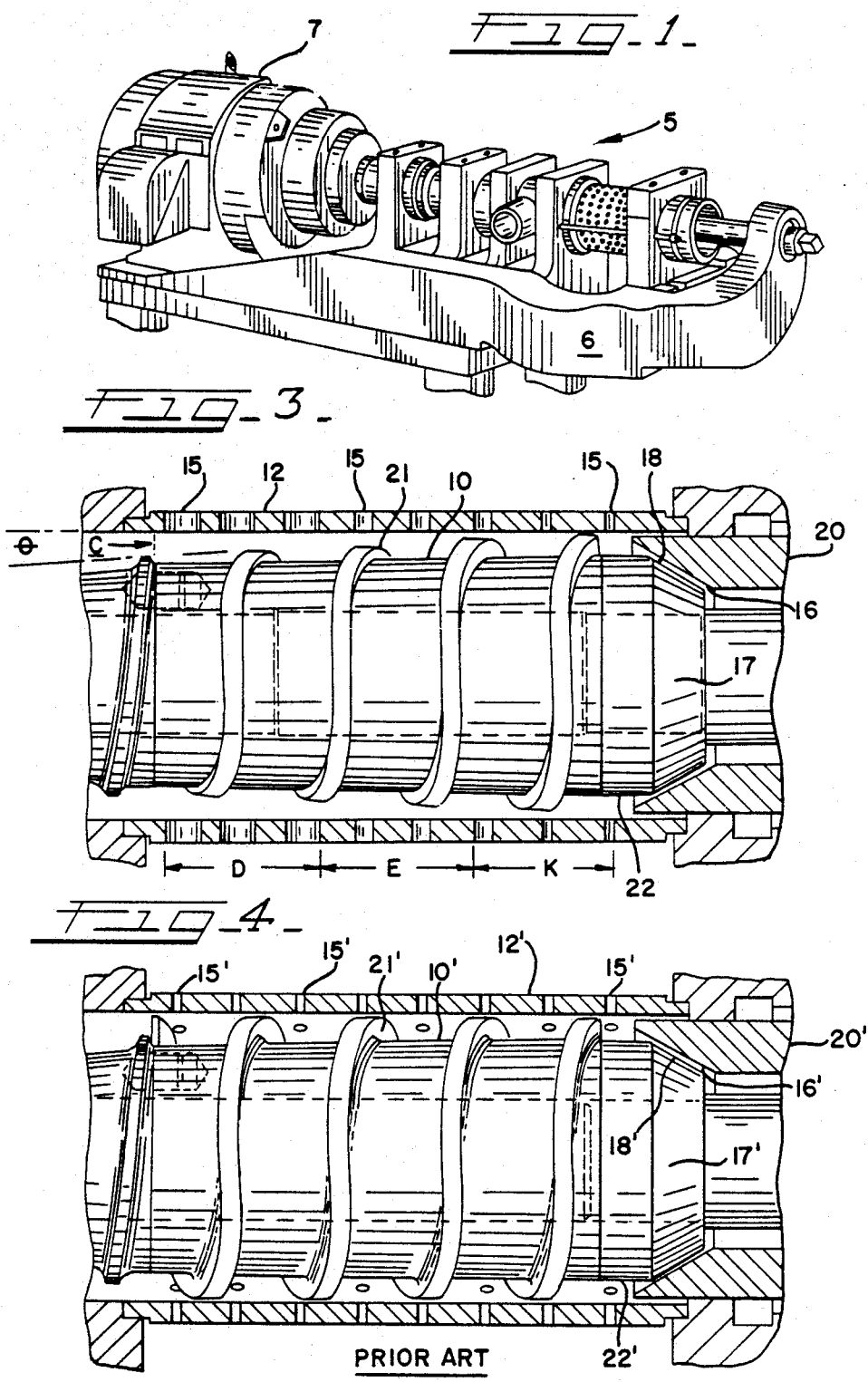
FIG. 1 is perspective view of the operational portion of a rotary feed-screw meat separating machine in which one embodiment of the present invention is incorporated.
Figure 2:
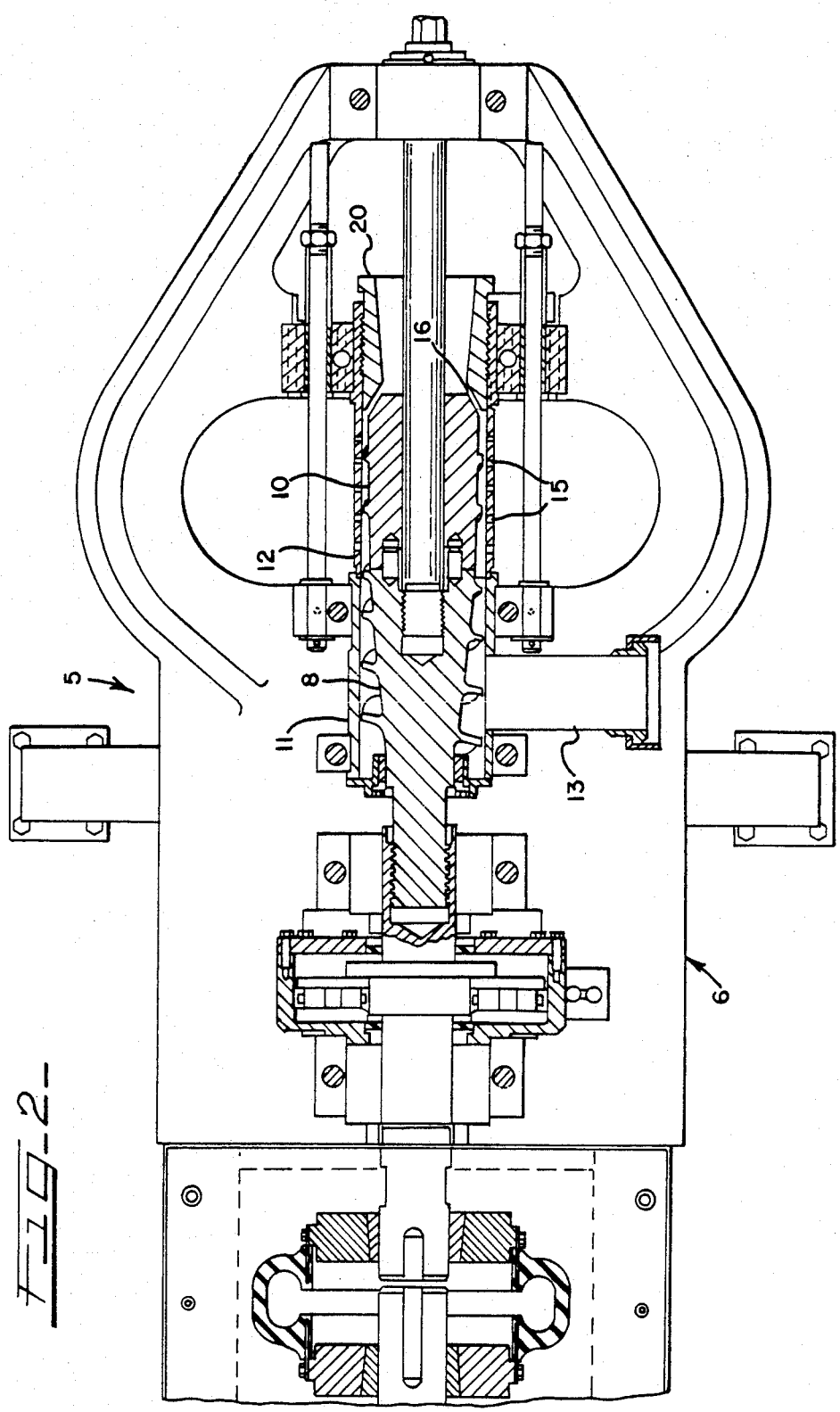
FIG. 2 is a fragmentary generally horizontal sectional view through a meat separating machine corresponding generally to the machine shown in FIG. 1.

The machine indicated generally at 5 in FIGS. 1 and 2 corresponds generally to the machine shown in FIG. 1 of the above-mentioned U.S. Pat. No. 4,042,176 except for the improvements therein which are hereinafter described in connection with FIG. 3. Accordingly, the detailed description of the meat deboning or separating machine 5 contained in U.S. Pat. No. 4,042,176 is incorporated herein by reference and made a part hereof. Briefly, the meat separating machine 5 includes a suitably supported rigid base or frame indicated generally at 6 on which is mounted a drive motor 7 capable of operating speeds in the range of 100–500 RPM so as to drive directly through suitable interconnections a two part auger, one part being a pressure auger 8 and the other part being a conveying auger 10. The pressure auger 8 rotates in an imperforate cylinder 11 while the conveying auger section 10 rotates within a foraminous cylindrical housing or screen 12.

Feed material which has appreciable meat and bone contents is introduced through the inlet 13 into the housing 11 and is delivered under pressure by the auger 8 into the infeed (i.e. left) end of the conveying auger 10-foraminous cylinder 12 combination. It is within this combination that meat is separated from the bone constituents and exudes or flows through the foramina or openings 15—15 (FIG. 2) and suitably collected.

Compacted bone material is discharged from the discharge end of the conveying auger 10 and foraminous cylinder 12 through an annular, frusto-conical orifice 16 (FIG. 2). This orifice is formed between the beveled end 17 (FIG. 3) on the end of the conveying auger 10 and the correspondingly beveled inner surface 18 within the adjacent end of sleeve-like valve member 20. The valve member 20 is co-axially adjustable with the auger 10 and the screen 12 so that the size of the annular discharge orifice 16 may be suitably adjusted as described U.S. Pat. No. 4,042,176.

In the prior art as set forth in U.S. Pat. No. 4,042,176 and more fully illustrated in FIG. 4, the foraminous cylinder or housing 12' was provided throughout its length with a plurality of small openings 15–15' having essentially the same size ranging up to 2.5 mm diameter. Further, the helical flight 21' on the conveying auger 10' in the prior art had a substantially uniform outer diameter from the inlet end to the discharge end of the auger and the resulting radial clearance between the outer diameter of the flight 21 and the inner diameter of the housing or screen 12' was substantially uniform from the inlet or infeed end to the discharge or outlet end. In U.S. Pat. No. 4,042,176 it is stated that this radial clearance can be in the range from 0.005 to 0.015 of an inch. In practice, in building YIELDMASTER machines in accordance with the teachings of U.S. Pat. No. 4,042,176 it has been found that preferred radial clearance is within the range 0.010 to 0.025 of an inch.

The structural and operational changes provided by the present invention will now be described with specific reference to FIG. 3. The foraminous or perforated cylinder or screen 12 is provided with a multitude of meat outlet openings or holes 15—15 which are substantially larger than normal at the infeed or upstream end of the screen (e.g. as large as 0.25 inch diameter) and which decrease progressively in size approaching the downstream or discharge end of the cylinder 12 to a much smaller size (0.05 inch diameter).

With respect to the conveying auger 10, the helical flight or flute 21 thereon does not have a uniform outer diameter but is tapered outwardly from the upstream or infeed end at the left toward the outlet or discharge at the right. Thus, the radial clearance C (FIG. 3) between the minimum outer diameter of the flight 21 at the infeed end and the inner diameter of the cylinder 12 may be in the order of 0.25 inch while the clearance between the last flight on the discharge end may be within the heretofore normal range of 0.010 to 0.025 inch. With an upstream clearance C of 0.25 inch and a final downstream radial clearance of between 0.010 and 0.015 inch the angle of taper is within the range of from about 3°00' to about 3°40'. A taper of 3°22' has been found to be suitable.

As a matter of convenience in production, the openings 15 in the screen 12 may be uniform in size for sections or portions of the axial length of the screen 12 rather than to progressively decrease uniformly in size. Thus, the openings in the section D may be uniform and of the largest size, the openings in section E may have a smaller and intermediate size, while the openings in section K may have the smallest size. By way of example, the inner diameter (ID) of the cylinder 12 may be 5.1 inch while the openings 15 in section D have a diameter of 0.25 inch, the openings in section E have a diameter of 0.125 inch, and the openings in section K have a diameter of 0.062 inch. In a modification it has been found that the openings 15 provided at the discharge end of the cylinder 12 surrounding the last complete flight on the auger 10 may be omitted completely.

In the construction of the auger 10, it is practical to uniformly increase the outer diameter of the flight 21 from the minimum OD at the infeed end to the maximum OD at the discharge end. However, it is also a practical alternative to increase the OD of the auger flight 21 in a series of steps rather than uniformly.

As the root diameter of the auger 10 increases from the inlet end to the discharge end where it reaches its maximum at the cylindrical land 22, the root depth preferably decreases thereby increasing the yield of meat removed without additional precompression.

As result of the foregoing changes in structural design of the foraminous cylinder 12-conveying auger 10 combination shown and described in connection with FIG. 3 from the corresponding cylinder-auger combination shown and described in connection with FIG. 4 representing the prior art, it has been found practical and desirable to substantially reduce the speed of rotation of the auger 10 in FIG. 3 to within the range of 100 to 500 RPM whereas U.S. Pat. No. 4,042,176 suggests a rotation speed for the conveying auger 10' in the range of 500 to 1800 RPM and in practice a speed of approximately 1150 RPM has been used.

As stated above, by reason of the structural and operational changes made and effected over the prior art, it has been found that the efficiency of the meat separating function has been enhanced and the quality of the separated meat has been substantially improved. These improvements have been reflected in a substantial reduction in the shearing of bone particles between the auger flights and the screen holes, a substantial reduction in auger rotation speeds and the required extrusion pressure, with an attendant decrease in product temperature rise. These improvements in turn result in an improved particle definition of the meat that is separated thereby enhancing its value in subsequent processing through better binding properties and less denaturing.

What is claimed:

1. In a machine for separating meat from a feed material having an appreciable content of bone and including, a foraminous cylinder having a rear infeed end and a front discharge end, a conveying auger co-axially rotatable within said foraminous cylinder, and valve means at the discharge end of said auger providing a restricted orifice through which compacted de-meated bone material discharges, the improvement which comprises, the outer diameter of the flight on said auger being tapered outwardly from its infeed end to its discharging end with the radial clearance between the outer diameter of the flight on said auger at its infeed end and the inner diameter of said cylinder being approximately 0.25 inch., and with the radial clearance between the outer diameter of the flight on said auger at its discharge end and the inner diameter of said cylinder being in the range of from about 0.010 to about 0.025 of an inch and the areas of the foramina in said cylinder being substantially greater at said infeed end and becoming substantially smaller toward said discharge end.

2. The improvement called for in claim 1, wherein the angle of said taper on the outer diameter of said auger flight is in the range of from about 3°00' to about 3°40'.

3. The improvement called for in claim 1, wherein said taper on the outer diameter of said auger flight comprises plurality of cylindrical steps of uniform outer diameter.

4. The improvement called for in claim 1, wherein the root depth of said auger decreases as the flight diameter thereof increases.

5. The improvement called for in claim 1, wherein said taper terminates at approximately the last flight on said auger and said radial clearance remains substantially uniform from the end of said taper to the end of said auger.

6. The improvement called for in claim 1, wherein said cylinder is non-foraminous adjacent its discharge end.

7. The improvement called for in claim 1, wherein the discharge end of said cylinder is non-foraminous commencing with the portion surrounding the last flight of said auger.

8. The improvement called for in claim 1, wherein said areas of said foramina decrease in a plurality of steps, being uniform within each step.

9. In the method of separating meat from a feed material having an appreciable bone content in a machine including a foraminous cylinder having an infeed end and a discharge end through the foramina of which meat exudes, a conveying auger having an infeed end and a discharge end co-axially rotatable within said cylinder, and valve means disposed in communication with said discharge ends an providing a restrict orifice through which compacted de-meated bone material discharges, the outer diameter of the flight on said auger being tapered outwardly from its infeed end to its discharge end with the radial clearance between the outer diameter of the flight on said auger at its infeed end and the inner diameter of said cylinder being approximately 0.25 inch and with the radial clearance between the outer diameter of the flight on said auger at its discharge end and the inner diameter of said cylinder being in the range of from about 0.010 to about 0.025 of an inch, the areas of the foramina in said cylinder being substantially greater at said infeed end and becoming substantially smaller toward said discharge end, the steps which comprise, rotating said auger at a speed within the range of from about 100 to about 500 RPM, introducing said feed material under pressure into said infeed end of said cylinder whereat said radial clearance is approximately 0.25 inch, and conveying said material within said cylinder from its said infeed end to its said discharge end whereat said discharge end said radial clearance is in said range of from about 0.010 to about 0.025 of an inch.

* * * * *